No. 654,366. Patented July 24, 1900.
B. F. SWEET.
HUB FOR VEHICLES.
(Application filed May 19, 1900.)
(No Model.) 2 Sheets—Sheet 1.
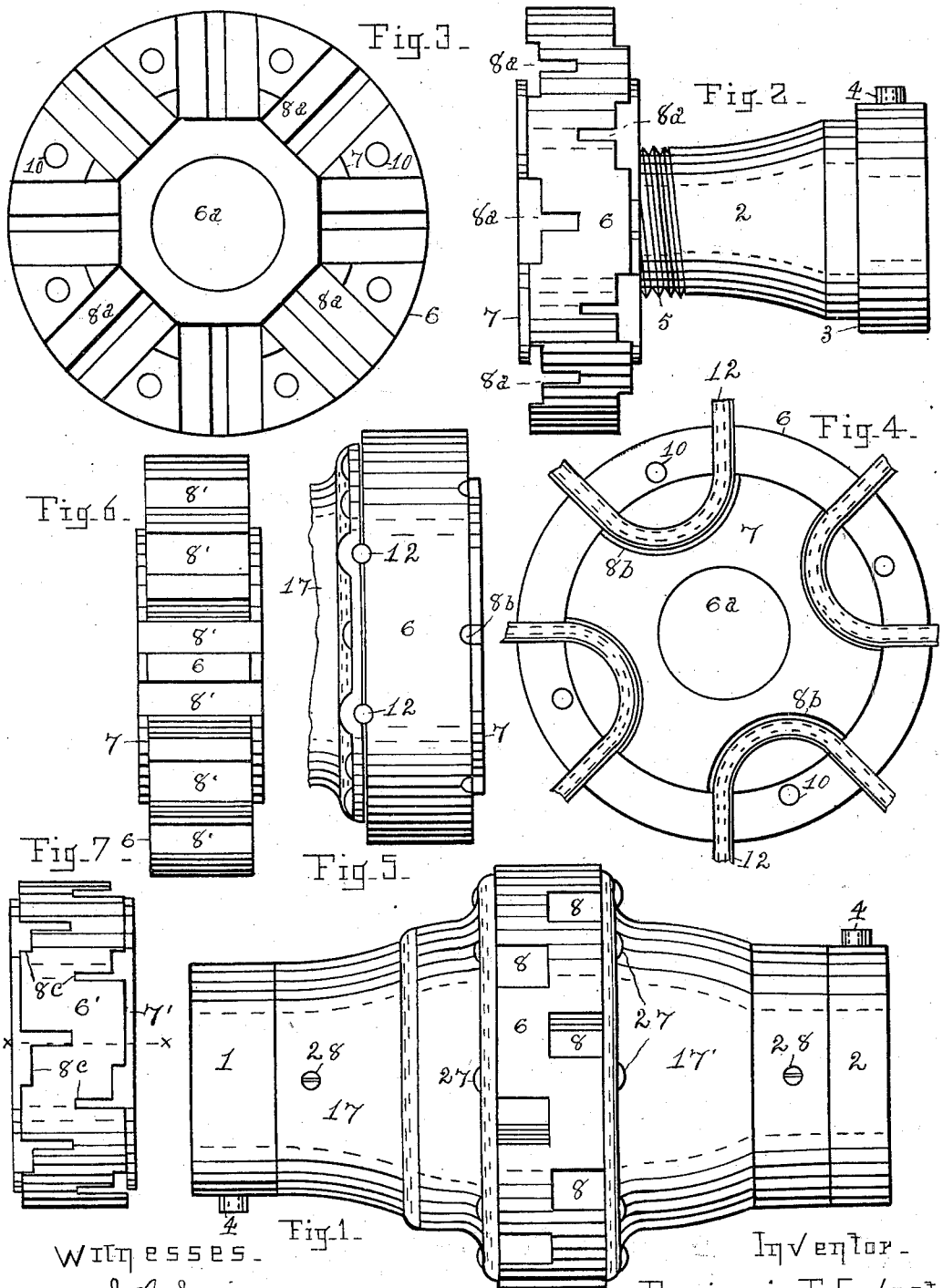
Witnesses
J. A. Jamison.
C. M. Albee.
Inventor
Benjamin F. Sweet.
per G. H. Albee.
Attorney No. 654,366. Patented July 24, 1900.
B. F. SWEET.
HUB FOR VEHICLES.
(Application filed May 19, 1900.)
(No Model.) 2 Sheets—Sheet 2.
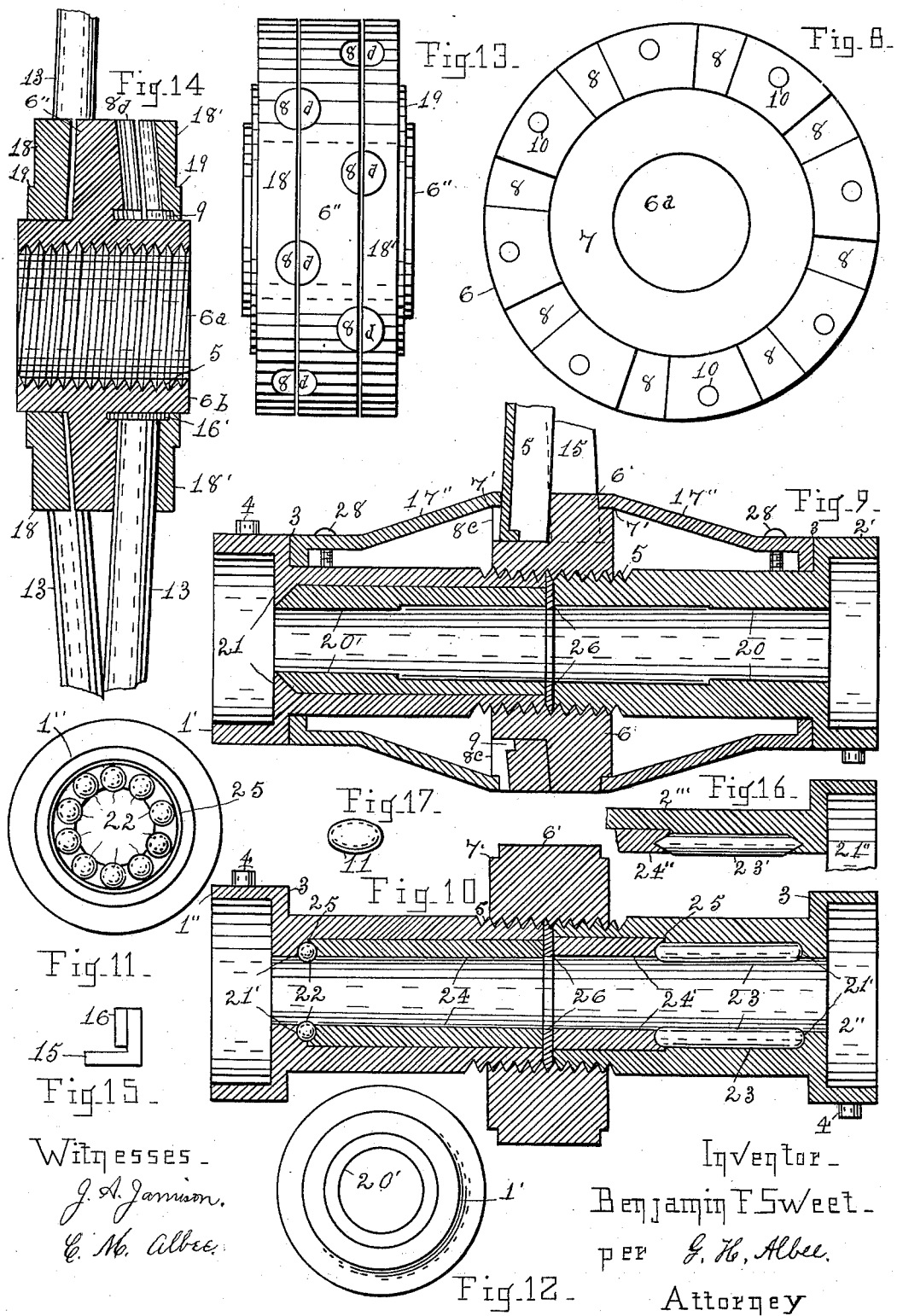
Witnesses
J. A. Jamison.
E. M. Albee.
Inventor
Benjamin F. Sweet
per G. H. Albee.
Attorney

UNITED STATES PATENT OFFICE.

BENJAMIN F. SWEET, OF FOND DU LAC, WISCONSIN.

HUB FOR VEHICLES.

SPECIFICATION forming part of Letters Patent No. 654,366, dated July 24, 1900.

Application filed May 19, 1900. Serial No. 17,201. (No model.)

*To all whom it may concern:*

Be it known that I, BENJAMIN F. SWEET, a citizen of the United States, and a resident of Fond du Lac, in the county of Fond du Lac and State of Wisconsin, have invented a new and useful Improvement in Hubs for Vehicles and other Purposes, of which the following is a specification.

My invention relates to hubs both for large and small vehicles which may be used for various purposes and also for pulleys for shafting, for which they are well adapted. These hubs are more particularly designed for vehicle-wheels where great strength or unusual height is required—such as for portable engines, gun-carriages, army-wagons, automobiles, log-wagons, &c.; and one object of my invention is to make wheels of the knockdown order, whereby large or other wheels can after being entirely completed be taken apart and the hubs and boxes, spokes, fellies, and tires or rims (the fellies and tires or rims being made integral and in sections secured together with bolts) be packed in boxes of suitable size and shipped as freight at ordinary rates for freight that is not bulky.

My improvements are illustrated in the accompanying drawings, in which—

Figure 1 is a side elevation of a hub embodying my invention. Fig. 2 is a side elevation showing the central hub portion having spoke-sockets for T-iron and the tubular bolt which enters into the construction of the hub screwed into one end of said central portion. Fig. 3 is a plan of the central portion of the hub, showing spoke-sockets adapted for T-iron spokes. Fig. 4 is a plan of the central portion of the hub having wire spokes therein. Fig. 5 is a top view of the central portion of the hub fitted for wire spokes, one end of it having spokes held therein with a cone-frustum-shaped thimble or washer fragment. Fig. 6 is a top view of the central hub portion having spoke-sockets extending entirely across said hub portion. Fig. 7 is a top view of a hub having spoke-sockets for angle-iron. Fig. 8 is an end view or plan of the central part of the hub having spoke-sockets of rectangular form, similar to those in Fig. 1. Fig. 9 is a vertical section upon the line *x x* of Fig. 7 and showing the two tubular bolts, the central hub portion having a part of two angle-iron spokes upon the upper side and a spoke-socket in the lower side adapted for a spoke of angle-iron, the two cone-frustum-shaped thimbles or washers, and an ordinary axle-box fitted within the two tubular bolts, one of them showing the axle-box integral with the bolt and the other a removable box. Fig. 10 is a vertical section showing the two tubular bolts, the central hub portion, and an axle-journal bearing, one end being fitted with balls and the other with rollers. Fig. 11 is an end view of the inner end of one of the tubular bolts with the balls or rollers, upon a larger scale than in Fig. 10, arranged therein, the thimble for retaining them in position being omitted. Fig. 12 is an end view of the inner end of one of the tubular bolts having an ordinary axle-box therein. Fig. 13 is a top view of a hub central part having spoke-sockets for round or other shaped iron or tubes. Fig. 14 is a vertical section of a central hub portion, similar to the one in Fig. 13, through two of its spoke-sockets, one of them having the inner end of a spoke therein and a part of two other spokes being shown in position in the hub-section. Fig. 15 is an end view of an angle-iron spoke for which the hubs in Figs. 7 and 9 are adapted. Fig. 16 is a fragment of the right-hand tubular bolt shown in Fig. 10 and showing a modification in the form of the ends of the rollers, of the roller-bearing, and of the sockets or seats in the tubular bolts and the retaining-thimbles for holding the rollers in position while revolving. Fig. 17 is an end view of an oval-iron spoke adapted for use in the hub-sections shown in Figs. 4, 5, 13, and 14 by making a slight change in the form of their spoke-sockets.

Similar numerals indicate like parts in the several views.

1 2, 1' 2', 1'' 2'', and 2''' indicate left and right hand tubular bolts, respectively; 3, the shoulder under the tubular-bolt head; 4, lugs upon the tubular-bolt heads; 5, threads upon the tubular bolts, which engage corresponding threads in the hub-sections; 6 6' 6'', central hub-sections; 6ª, the central screw-hole in the hub-sections; 6ᵇ, the hub of section 6''; 7 7', shoulders on the central hub-sections; 8 8' 8ª 8ᵇ 8ᶜ 8ᵈ, spoke-sockets in the hub-sections; 9, side sockets in spoke-sockets for receiving lips of spokes; 10, bolt or rivet holes in hub-sections; 11, oval-iron spokes; 12, wire spokes; 13, round-iron or pike spokes; 14, T-iron spokes; 15, angle-iron spokes; 16 16', lips upon spoke-tenons; 17 17' 17'', thimbles or cone-frustum-shaped washers; 18 18', concave washers; 19, a shoulder upon a concave washer; 20, axle-box integral with tubular bolt; 20', axle-box sections separate from tubular bolt; 21 21' 21'', shoulders in the outer ends of the tubular bolts; 22, balls in the axle-box; 23 23', rollers in axle-box; 24 24' 24'', thimbles for retaining balls and rollers respectively in position; 25, shoulders within tubular bolts for preventing the entrance too far of the thimbles 24, 24', and 24''; 26, a compressible washer of leather or other suitable material; 27, bolts or rivets through thimble 17, the central hub-section, and thimble 17'; 28, screws through thimbles 17, 17', and 17''.

As will be seen in the several figures, there are many forms of spokes for which this construction of hub is adapted, as wood spokes in Figs. 1, 6, and 8 and metallic spokes in Figs. 2, 3, 4, 5, 9, 13, and 14. The central hub-sections are intended to be made of cast metal and the central screw-hole and spoke-sockets formed in casting them. The hub-sections are then to be bored and screw-threaded for receiving the tubular bolts. The bolt-holes 10 can be formed and the shoulders 7 7' or 19 turned off and the space outside of said shoulders faced up, if a fine finish is desired, or the shoulders and space can be left as cast, if desired.

For some forms of spokes instead of making the central part of a single piece it may be, as shown in Figs. 13 and 14, in three parts, the central part with a hub long enough to receive the threaded ends of the tubular bolts and two washers 18 and 18', one upon each end of the hub of the central part and between which the sockets for receiving the spokes are formed, they being formed wholly or partly in the central section, as the particular spoke to be used requires. This form of hub can be used with thimbles 17 17', as in Fig. 1, or with 17'', as in Fig. 9, the former having bolts through thimbles and hub-sections and the latter without said bolts. The meeting surfaces of the central section and washers 18 18' can be made concave and convex, as shown, or the spoke-sockets can be formed for giving the necessary inclination to the spokes and said surfaces made straight and the washers be a flat disk.

The tubular bolts are threaded, bored, and fitted for the axle, as shown in the right-hand end of Fig. 9, or provided with removable axle-boxes, as shown in the left-hand end of said figure, as may be desired. Each hub is intended to have its tubular bolts both with integral axle-journals, as in the right hand of Fig. 9, or both with removable axle-journals, as in the left-hand end of said figure. The sections 20' are to be carefully fitted for insertion into the bore of the tubular bolts, their entrance too far being prevented by the shoulders 21 and their bore having the necessary taper for the usual carriage-axle. If desired, the tubular bolts may be fitted for receiving balls, as in the left-hand end of Fig. 10, rollers, as in the right-hand end of said figure, or rollers of the form shown in Fig. 16. In either case seats are formed near the outer ends of the tubular bolts for receiving the particular form used. Both ends of the hub are intended to be provided with the same form of antifriction device, as balls or rollers, although that is not essential. The tubular bolts are provided with shoulders 25 for limiting the distance to which the thimbles 24, 24', or 24'' can be inserted, so as to provide seats with ample room for balls or rollers to revolve within.

The rollers are made longer upon their axial line than upon their surface that comes in contact with the vehicle-axle, their ends being globular or cone-shaped in form, and both the balls and rollers are provided with seats in the tubular bolts and in the ball and roller retaining thimbles of a form corresponding with the form of the antifriction device which may be used.

The inner ends of the axle-box sections and of the ball or roller retaining thimbles, as shown in Figs. 9 and 10, should be turned off to the required length and flush with the inner ends of the tubular bolts, so that when the bolts are screwed into the hub-section and the thimbles 17, 17', or 17'' placed in position between the bolt-head and spokes in the central hub-section or the washers 18 18', as the case may be, the screwing in of said tubular bolts will bring the inner ends of the bolts and box-sections up to a stop against each other or preferably up against a compressible washer and hold the box-sections firmly in place and against turning around in said tubular bolts, both bolts having right-hand threads, so that they can be screwed up tightly against each other.

The tubular bolts are to be screwed into the hub-sections with a spanner engaged with the lug 4 and may be secured from turning backward and becoming loose by the insertion of a screw through the thimbles 17, 17', or 17'', as shown in Figs. 1 and 9.

Having described my invention, what I claim, and desire to secure by Letters Patent, is—

1. A vehicle-hub composed of the following elements, a central hub-section adapted to have a series of spokes arranged and projecting from its circumference and being provided with a centrally-arranged and threaded aperture, two tubular bolts, each having a head and a threaded inner end, the latter being adapted to be screwed into the aforesaid threaded aperture of the hub-section; said tubular bolts being adapted to be fitted for receiving and for revolving upon a vehicle-axle, and a thimble, or washer, mounted upon each of said bolts between their heads and the central hub-section, their dimensions lengthwise of the hub being adapted to compress the spokes when placed in position around said hub against their respective sockets therein, when the inner ends of said tubular bolts are screwed into said hub-section and are stopped from further entrance by each other, substantially as described.

2. A vehicle-hub composed of the following elements, a central hub-section adapted to have a series of spokes arranged and projecting from its circumference and being provided with a centrally-arranged threaded aperture, two tubular bolts, each having a head and a threaded inner end, the latter being adapted to be screwed into the aforesaid threaded aperture of the hub-section, said tubular bolts each having an axle-box section separate from its bolt adapted for receiving and for revolving upon a vehicle-axle, a shoulder or stop in said tubular bolts for limiting the entrance of said axle-box sections, the inner ends of said axle-box sections being flush with the inner ends of their respective tubular bolts, a thimble or washer mounted upon each of said bolts between their heads and the central hub-section, their dimensions lengthwise of the hub being adapted to compress the spokes when placed in position around said hub, against their respective sockets therein, when the inner ends of said tubular bolts are screwed into said hub-section and are stopped from further entrance by each other, substantially as described.

3. In a central hub-section adapted to have a series of spokes arranged and projecting from its circumference and having a centrally-arranged and threaded aperture, the combination of two tubular bolts, each having a head and a threaded inner end, the latter being adapted to be screwed into the aforesaid threaded aperture of the hub-section, and a compressible washer arranged between the meeting ends of said tubular bolts, said bolts being adapted to be fitted for receiving and for revolving upon a vehicle-axle, substantially as described.

4. A vehicle-hub composed of the following elements, a central hub-section having the ends of the hub of said central hub-section extended beyond the ends of the body of said hub-section and being provided with a centrally-arranged and threaded aperture, a washer mounted upon each of said hub extensions, sockets for holding a series of spokes between each of said washers and the aforesaid central hub-section, two tubular bolts each having a head and a threaded inner end, the latter being adapted to be screwed into the centrally-arranged threaded aperture of said central hub-section, said tubular bolts being adapted to be fitted for receiving and for revolving upon a vehicle-axle, and a thimble or washer mounted upon each of said bolts between their heads and the central hub-section, their dimensions lengthwise of the hub being adapted to compress the spokes when placed in position around said hub, against their respective sockets therein, when the inner ends of said tubular bolts are screwed into said hub-section and are stopped from further entrance by each other, substantially as described.

5. A vehicle-hub composed of the following elements: a central hub-section adapted to have a series of spokes arranged and projecting from its circumference and being provided with a centrally-arranged and threaded aperture, two tubular bolts, each having a head and a threaded inner end, the latter being adapted to be screwed into the centrally-arranged threaded aperture of the hub-section, said tubular bolts being adapted to be fitted for receiving and for revolving upon a vehicle-axle, antifriction devices arranged near the outer ends of the bore of each of said tubular bolts, consisting of a series of uniform-shaped revoluble bodies whose axial line lengthwise of said tubular bolts is longer than the surface of said bodies coming in contact with the vehicle-axle, a seat formed within and near the outer end of each tubular bolt for retaining said antifriction devices, a thimble fitted for entering the bore at the inner end of each tubular bolt until stopped by a shoulder therein near said antifriction devices, the ends of said thimbles being of a form adjoining said antifriction devices corresponding therewith, and their ends at the inner ends of said tubular bolts being flush with the inner ends of said tubular bolts, and a thimble or washer mounted upon each of said tubular bolts between their heads and the central hub-section aforesaid, their lengths being adapted to compress the spokes against their sockets in the aforesaid central hub-section when the inner ends of said tubular bolts are screwed into the hub-section and are stopped from further entrance by each other, substantially as described.

B. F. SWEET.

Witnesses:
C. H. WATTS,
S. D. BAIRD.